United States Patent [19]

Moyers et al.

[11] Patent Number: 5,500,490
[45] Date of Patent: Mar. 19, 1996

[54] METHOD AND APPARATUS FOR FORMING LEAKPROOF FEED-THROUGH CONNECTOR

[75] Inventors: Chester E. Moyers; Robert L. Lenz, both of Sterling, Ill.

[73] Assignee: Borg-Warner Automotive, Inc., Sterling Heights, Mich.

[21] Appl. No.: 178,711

[22] Filed: Jan. 10, 1994

[51] Int. Cl.⁶ .................................................. H02G 3/22
[52] U.S. Cl. ................... 174/151; 174/65 R; 174/152 R
[58] Field of Search ............................... 174/151, 152 R, 174/153 R, 655 S, 65 G, 65 R, 152 G, 153 G; 285/162, 196, 338; 29/857, 858, 867

[56] References Cited

U.S. PATENT DOCUMENTS 4,329,540  5/1982  Howarth ........................ 174/153 R
5,278,357  1/1994  Yamanashi ........................ 174/151
5,352,853  10/1994 Takagi .............................. 174/65 R

FOREIGN PATENT DOCUMENTS 2115238  9/1983  United Kingdom .................. 174/151

*Primary Examiner*—Kristine L. Kincaid
*Assistant Examiner*—Paramita Ghosh
*Attorney, Agent, or Firm*—Harness, Dickey & Pierce; Greg Dziegielewski

[57] ABSTRACT

The connector permits wires to be used to conduct signals through a fluid-tight boundary. The wire sheath is removed around a medial portion of the wire to expose the surface of the inner conductor. A sealing material contacts the inner conductor surface and also the adjacent sheath surfaces, thereby defining a serpentine boundary which inhibits fluid leakage along the wire surface.

16 Claims, 3 Drawing Sheets

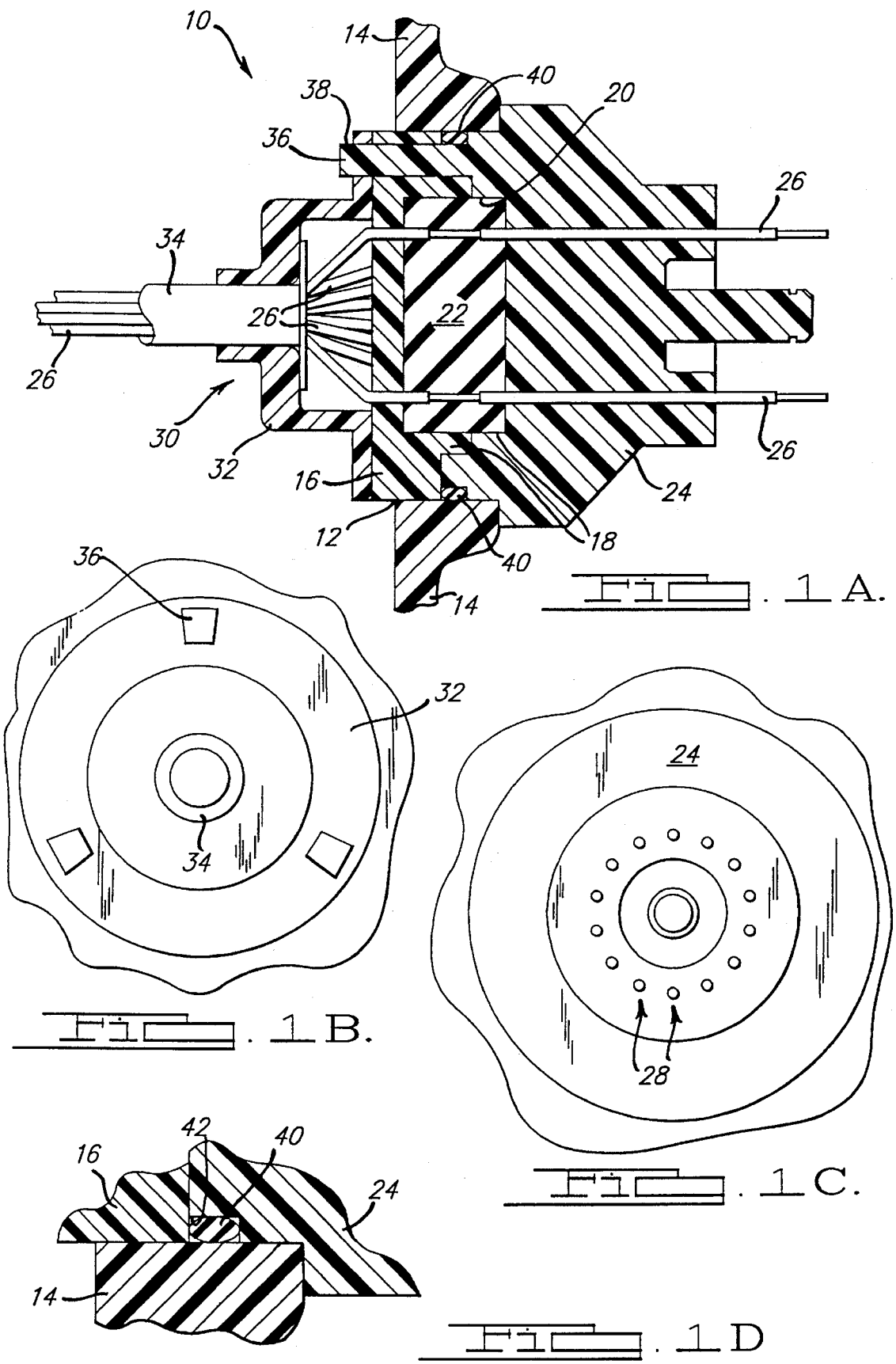

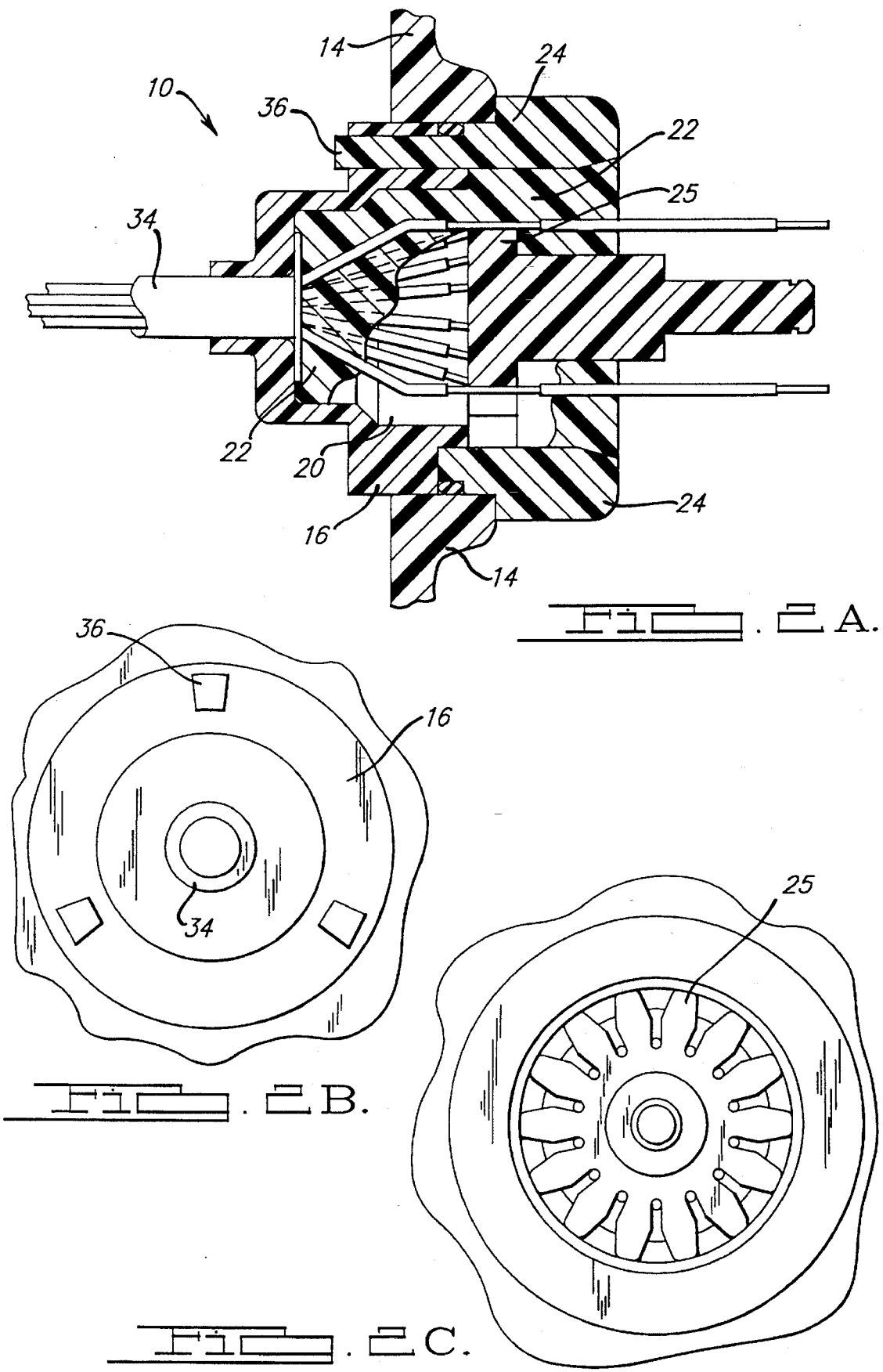

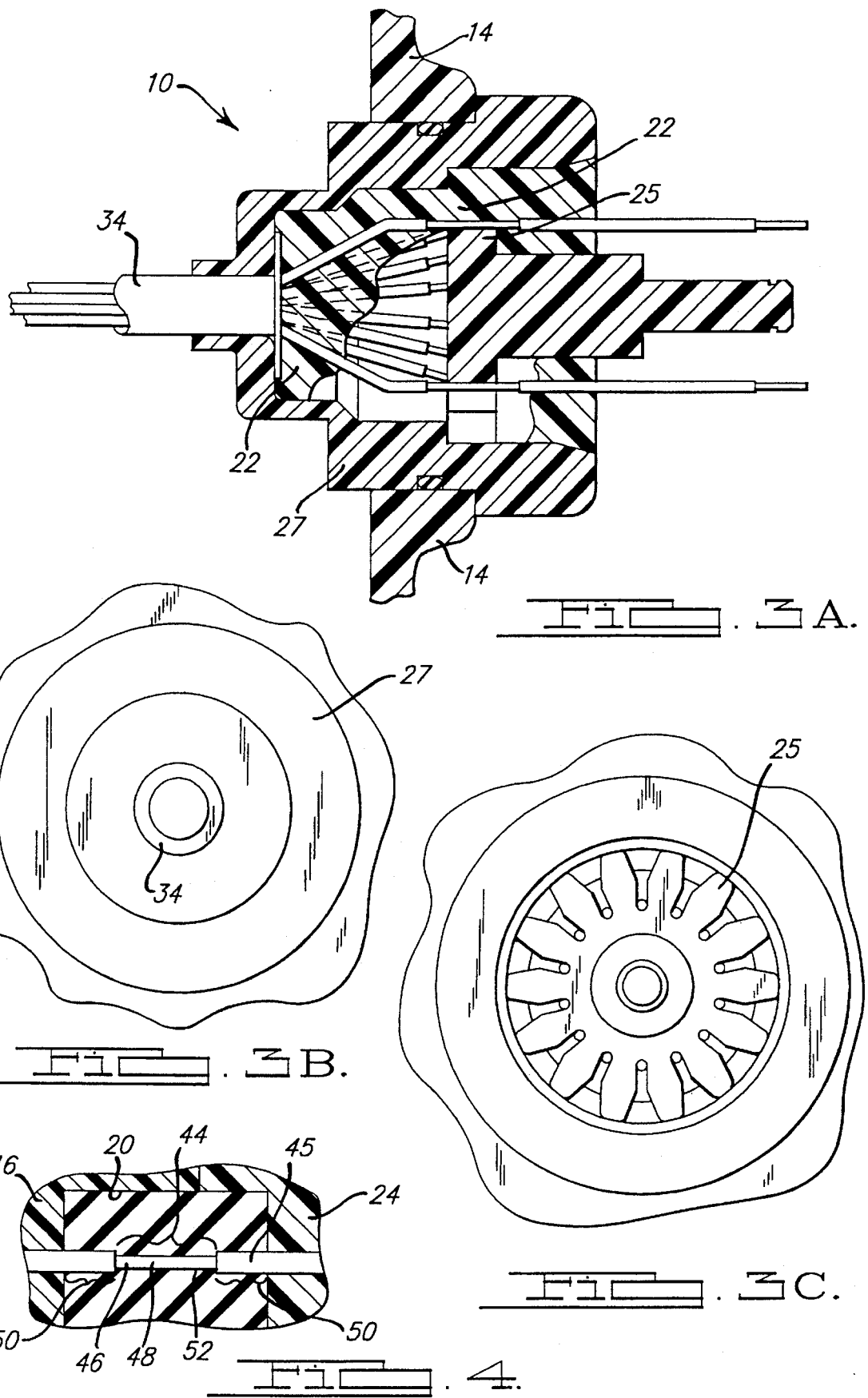

5,500,490

METHOD AND APPARATUS FOR FORMING LEAKPROOF FEED-THROUGH CONNECTOR

BACKGROUND AND SUMMARY OF THE INVENTION

The present invention relates generally to electrical connectors. More particularly, the invention relates to a feed-through connector and method of making the same, for the transmission of electrical signals across a boundary such as a fluid boundary.

Feed-through connectors find many applications where an electrical signal must be conveyed across a boundary, through a bulkhead or chassis wall, etc. Where the boundary serves as a fluid barrier, such as in the case of an oil-containing engine or transmission casing, the connector should be made as leakproof as possible. This is especially true when the fluid system is pressurized.

In the past it has been recognized that when wires are used to convey a signal from one side of the fluid barrier to the other, leakage will often occur at the aperture through which the wire is passed. In some instances, the wire will act as a wick, tending to duct fluid through the aperture causing leaks. It has heretofore been quite difficult to prevent such leaks using conventional sealing components. Sealing components, such as caulking material, tends to lose its resiliency over time, allowing leaks to occur.

Accordingly, in many leak-prone applications a solder-type connector is used. While less apt to leak, such connectors are expensive to use in manufacturing operations, since labor is required to solder wires to both ends of the connector. Also, solder-type connectors tend to be rather large and bulky, since they must be of a certain size in order to accommodate the soldering of a wire lead. Furthermore, solder-type connectors are more prone to failure, since each solder joint represents a potential failure point. By way of example, a 14 wire harness would require 28 solder connections in order to conduct all signals through a boundary wall or bulkhead. In addition to being potential failure points due to poor soldering or breakage, multiple solder connections can also result in shorted wires due to solder bridging between adjacent connector pins.

Another type of connector sometimes used to transmit signals across a boundary is the conventional plug and jack arrangement in which the plug communicates with one side of the boundary and the jack communicates with the other side. Although suitable for some applications, the plug and jack connector may not be suitable in applications where there is a lot of vibration. Also, being separable units, plug and jack connectors rely on physical contact between two conductor surfaces (plug and jack surfaces). When the surfaces become corroded or oxidized, signal flow is impeded.

The present invention provides a connector apparatus and method of low cost which is well-suited to mass production applications. The connector can be used to pass signals through fluid barriers, bulkheads, engine and transmission casings, and the like without the need for any soldered connections. In addition, the connector does not require separate physical plug and jack components, but instead utilizes a continuous wire conductor to convey the signal from one side of the fluid barrier to the other. Thus the connector of the invention will not degrade signal performance due to corrosion or oxidation and it will not become intermittent when subjected to vibration.

In accordance with the inventive method, a leakproof feed-through connector is formed using one or more wires having a center conductor and having an outer concentric sheath. According to the method, a portion of the sheath around a medial section of the wire is removed to expose an annular surface of the conductor and to define an adjacent surface of the sheath. The wire is then placed in a supporting structure having a recess. The wire is placed so that the exposed annular surface is disposed within the recess. The recess is substantially filled with a sealing material so that the sealing material contacts both the exposed annular surface and the adjacent surface of the sheath. A sealing material is caused to be secured in place in contact with the annular surface and in contact with the adjacent surface of the sheath. In this way, the annular surface, the adjacent surface of the sheath, and the sealing material all coact to define a serpentine boundary which inhibits fluid leakage along the wire.

Thus the invention provides a leakproof, feed-through connector for conducting an electrical signal from one side of a fluid boundary to another, the fluid boundary having an aperture into which the feed-through connector is inserted. The connector comprises a plug portion having an outer surface which conforms to the shape of the aperture, for insertion in and sealing the aperture. A recess forming portion defining a recess is integrated with the plug portion. A wire supporting portion is also integrated with the plug portion. At least one wire for conducting an electrical signal is disposed in the wire supporting portion. The wire has a center conductor and an outer concentric sheath. A portion of the sheath around a medial section of the wire is removed to expose an annular surface of the conductor and to define an adjacent surface. The wire is disposed in the wire supporting portion so that the annular surface and the adjacent surface of the sheath are both disposed within the recess. A sealing material substantially fills the recess so that it contacts the annular surface and the adjacent surface. In this way the sealing material, the annular surface and the adjacent surface all coact to define a serpentine boundary which inhibits fluid leakage from one side of the fluid boundary to the other.

For a more complete understanding of the invention, its objects and advantages, reference may be had to the following specification and to the accompanying drawings.

BRIEF DESCRIPTION OF THE DRAWINGS

FIGS. 1A–1D (collectively referred to as FIG. 1) illustrates a first embodiment of the feed-through connector, FIG. 1A being a cross-sectional view, FIG. 1B being a first end view, FIG. 1C being an opposite end view and FIG. 1D is an enlarged cross-sectional view showing the preferred manner of providing an O-ring seal;

FIGS. 2A–2C (collectively referred to as FIG. 2) illustrates a second embodiment of the feed-through connector, FIG. 2A being a cross-sectional view, FIG. 2B being a first end view and FIG. 2C being an opposite end view;

FIGS. 3A–3C (collectively referred to as FIG. 3) illustrates a third embodiment of the feed-through connector, FIG. 3A being a cross-sectional view, FIG. 3B being a first end view and FIG. 3C being an opposite end view; and FIG. 4 is a detailed cross-sectional view showing the serpentine boundary defined by the wire center conductor, sheath and sealing material.

DESCRIPTION OF THE PREFERRED EMBODIMENTS

Referring to FIG. 1, the solderless feed-through connector is shown generally at 10. Connector 10 is designed to fit into an aperture 12 within a fluid boundary such as bulkhead 14. Connector 10 includes a two piece sealing assembly or plug assembly comprising an exterior plug portion 16 and an interior plug portion 24, which also serves as a wire supporting portion. The two piece plug assembly has an outer surface which conforms to the size and shape of the aperture 12. Connector 10 further includes a recess forming portion 18. In the embodiment illustrated in FIG. 1 the recess forming portion 18 is integrally fashioned in the plug portion 16 and wire supporting portion 24. The recess forming portion 18 defines a recess 20 which is filled with a sealing material 22 more fully described below.

In the illustrated embodiment of FIG. 1, the wire supporting plug portions have a plurality of holes through which a plurality of individual wires 26 are inserted. Preferably, the interior plug portion 24 has a pattern of equally spaced holes 28 (shown in FIG. 1C), which serve to keep the wires spaced apart and well-organized.

If desired, one or more strain relief structures, such as structure 30 may be included. In FIG. 1 a single strain relief structure has been illustrated on the left-hand side of the bulkhead. Of course, if desired, a similar structure could be provided on the right-hand side of the bulkhead. As illustrated, the strain relief structure may be implemented using a cup-shaped member 32 which is open at its center to receive a flared strain relief jacket 34. Wires 26 pass within the strain relief jacket, as illustrated.

The presently preferred connector may be fabricated from plastic. In the embodiment illustrated in FIG. 1 the interior plug portion 24 has a plurality of tangs 36 which pass through holes in the exterior plug portion 16 and in the cup-shaped strain relief member 32 as at 38. The tangs are heat-staked to hold the structure together after assembly.

In order to ensure a tight seal with bulkhead 14, an O-ring 40 is provided. Note that the O-ring is positioned within a channel 42 formed by the abutting plug portions 16 and 24 around the outer periphery of the connector. This is illustrated in the enlarged view of FIG. 1D.

The sealing material 22 may take several forms. It can be injected into recess 20 in a fluid state and allowed to harden, or it may be in the form of a compressible plug having the necessary holes provided to receive wires 26. FIG. 1 illustrates an example of the latter case. Sealing material 22 is inserted into the recess during assembly of the connector and the wires are passed through suitable holes in the sealing material before the tangs 36 are heat-staked. To inhibit leakage by fluid being ducted along the surface of the wires the following procedure is followed.

Referring to FIG. 4, a medial section 44 of the wire sheath 45 is removed to expose an annular surface 46 of the wire's conductor 48. The wire is placed in the wire supporting portions of plug portions 16 and 24 and plug 16 so that the annular surface 46 is disposed within recess 20. Removal of the sheath around the medial section 44 leaves two disjunct surfaces of sheath 45 adjacent the annular conductor portion 46. This defines a discontinuous surface configuration, i.e. the annular surface of the conductor is disposed radially inwardly and disjunct from the adjacent surface of the sheath on both sides. If stranded wire has been used, it may be desirable to solder-dip the conductor to prevent oil from permeating into and migrating through the stranded bundle. Alternatively, if pretinned stranded wire has been used, it may be sufficient to simply heat the strands enough to melt the solder-tinning. The sealing material 22 is then secured in place so that it contacts annular surface 46 and also the adjacent surfaces 50 of the sheath. This contact results in a coaction of the annular surface, the adjacent surface and the sealing material to define a serpentine boundary (highlighted by thickened lines 52 in FIG. 4). This serpentine boundary serves to inhibit fluid leakage along the wire surface.

In order to ensure good contact between the sealing material and the annular surface and adjacent surfaces, the sealing material 22 may be force-fit in or crimped in recess 20. This may be accomplished, for example, by forming the plug and wire-supporting portions so that the inner diameter of recess 20 is slightly smaller than the outer diameter of sealing material 22. This causes radially inward forces to be applied to the sealing material, effectively forcing it into tight contact with the annular surface 46 and adjacent surfaces 50.

The embodiment illustrated in FIG. 2 is somewhat different from that of FIG. 1, in that the sealing material 22 is poured in or injected in as a potting material. In FIG. 2A the sealing material is shown partially cut away to reveal the embedded wires. Also, the interior plug portion 24 includes a separate spider arrangement 25 (see FIG. 2C) which may be interfit into portion 24 as a separate piece. In addition the exterior plug member 16 integrally defines the cup-shaped member 32 and thus cup-shaped member 32 serves to form part of recess 20.

Aside from these configuration differences, essentially the same treatment is applied to the wire, by removing a medial section to expose an annular surface of the conductor and define adjacent surfaces of the sheath. Similarly, the poured in or injected in sealing material contacts the annular surface and the adjacent surfaces to define serpentine boundaries as discussed above.

The embodiment of FIG. 3 is similar to that of FIG. 2, except that a one piece plug portion or housing 27 is used in place of the interfitting two piece plug portions. As in the embodiment of FIG. 2, the embodiment of FIG. 3 also uses a separate spider arrangement 25 which serves as a wire separator. Again, the manner of treating the wires to form the serpentine boundary is essentially the same in this embodiment.

Thus, regardless of the number of individual pieces used to fabricate the assembly, the resulting structure is designed to seal the aperture through bulkhead 14 while forming an interior cavity 20 which may be filled with some form of sealing material 22. The wire supporting structures serve to organize and space the wires apart, so that they will not inadvertently short out and so that the sealing material will adequately contact the serpentine boundary of each wire to inhibit fluid leakage. Although three different embodiments of a suitable structure have been illustrated, there are many variations possible.

From the foregoing it will be seen that the connector of the invention and its method of fabrication can be manufactured easily and economically, using easily worked, lightweight and durable plastic materials. The serpentine boundary resulting from the coaction of the sealing material with the annular conductor surface and adjacent sheath surfaces provides an effective seal against fluid leakage along the surface of the wire. The invention thus makes it possible to conduct signals from one side of a fluid boundary to the other without the need to solder to connector terminals and without the need to use a plug and jack connection, which can degrade signal conductance due to mechanical vibration, corrosion and oxidation. Accordingly, the connector of the invention is well suited for mass production applications, such as conveying sensor and control signals into and out of an engine or transmission casing, where oil leakage is a problem.

While the invention has been described in its presently preferred embodiments, it will be understood that the principles of the invention may be adapted to a variety of different configurations without departing from the spirit of the invention as set forth in the appended claims.

What is claimed is:

1. A method of forming a leakproof feed-through connector for use with wires having a center conductor and having an outer concentric sheath, comprising:

removing a portion of the sheath around a medial section of a wire to expose an annular surface of the conductor and to define an adjacent surface of the sheath;

placing the wire in a supporting structure having a recess of a predefined diameter, the wire being placed so that the exposed annular surface is disposed within said recess;

fabricating a sealing material to define an outer diameter larger than the predefined diameter of said recess and passing the wire through said sealing material;

causing said sealing material to be secured by force-fit in contact with said annular surface and said adjacent surface of the sheath, such that the annular surface, the adjacent surface of the sheath and the sealing material coact to define a serpentine boundary to inhibit fluid leakage along the wire.

2. The method of claim 1 further comprising sealing said supporting structure in an orifice and using said supporting structure as a plug to prevent fluid leakage through said orifice.

3. The method of claim 1 wherein the step of removing a portion of the sheath forms two spaced apart edges in the sheath and wherein said recess filling step causes the sealing material to contact both edges, thereby forming a plurality of serpentine boundaries to inhibit fluid leakage along the wire.

4. The method of claim 1 further comprising:

removing a portion of the sheath around a medial section of at least one additional wire to expose a second annular surface and to define a second adjacent surface of the sheath;

placing the additional wire in said supporting structure, the additional wire being placed so that the second exposed annular surface is disposed within said recess;

substantially filling said recess with said sealing material so that the sealing material contacts both said exposed annular surface and the adjacent surface of the sheath and also contacts both the second exposed annular surface and the second adjacent surface;

causing said sealing material to be secured in place in contact with said both said annular surface and said second annular surface and in contact with both said adjacent surface and said second adjacent surface, such that the annular surfaces, and the adjacent surfaces each coact with the sealing material to define serpentine boundaries each inhibiting fluid leakage along the wire.

5. The method of claim 1 further comprising using said supporting structure and said sealing material to secure a plurality of wires.

6. A leakproof feed-through connector for conducting an electrical signal from one side of a fluid boundary to the other side of a fluid boundary, the fluid boundary having an aperture, comprising:

a plug portion having an outer surface conforming to the shape of said aperture for insertion in and sealing said aperture;

a recess-forming portion defining a recess and integrated with said plug portion;

a wire supporting portion integrated with said plug portion;

at least one stranded wire for conducting an electrical signal having a stranded center conductor and having an outer concentric sheath, a portion of the sheath around a medial section of said wire being removed to expose an annular surface of said stranded center conductor and to defining an adjacent surface of said sheath;

said wire being disposed in said wire supporting portion with said annular surface and said adjacent surface being disposed within said recess;

said annular surface of said stranded center conductor having solder-tinning for fusing the strands of said center conductor in the region of said exposed annular surface;

a sealing material substantially filling said recess and contacting said annular surface and said adjacent surface, the sealing material, the annular surface and the adjacent surface coating to define a serpentine boundary to inhibit fluid leakage from one side of the fluid boundary to the other.

7. The connector of claim 6 wherein said recess defining portion comprises means for defining a cavity.

8. The connector of claim 6 wherein said plug portion and said recess-forming portion comprise a unitary piece of material.

9. The connector of claim 6 wherein said plug portion comprises first and second components which mate together.

10. The connector of claim 9 wherein said first and second components mate together to define said recess defining portion.

11. The connector of claim 6 wherein said wire supporting portion and said plug portion comprise a unitary piece of material.

12. The connector of claim 6 wherein said wire supporting portion has structure for holding a plurality of wires in a spaced apart configuration.

13. The connector of claim 6 wherein said sealing material comprises a potting material.

14. The connector of claim 6 wherein said sealing material comprises a plug having at least one aperture for receiving said wire.

15. The connector of claim 6 wherein said plug portion includes a structure for applying a radially inward clamping force on said sealing material.

16. The connector of claim 6 wherein a portion of said sheath is removed to form two spaced apart edges in the sheath and wherein said sealing material contacts both edges, thereby forming a plurality of serpentine boundaries to inhibit fluid leakage along the wire.

* * * * *